UNITED STATES PATENT OFFICE.

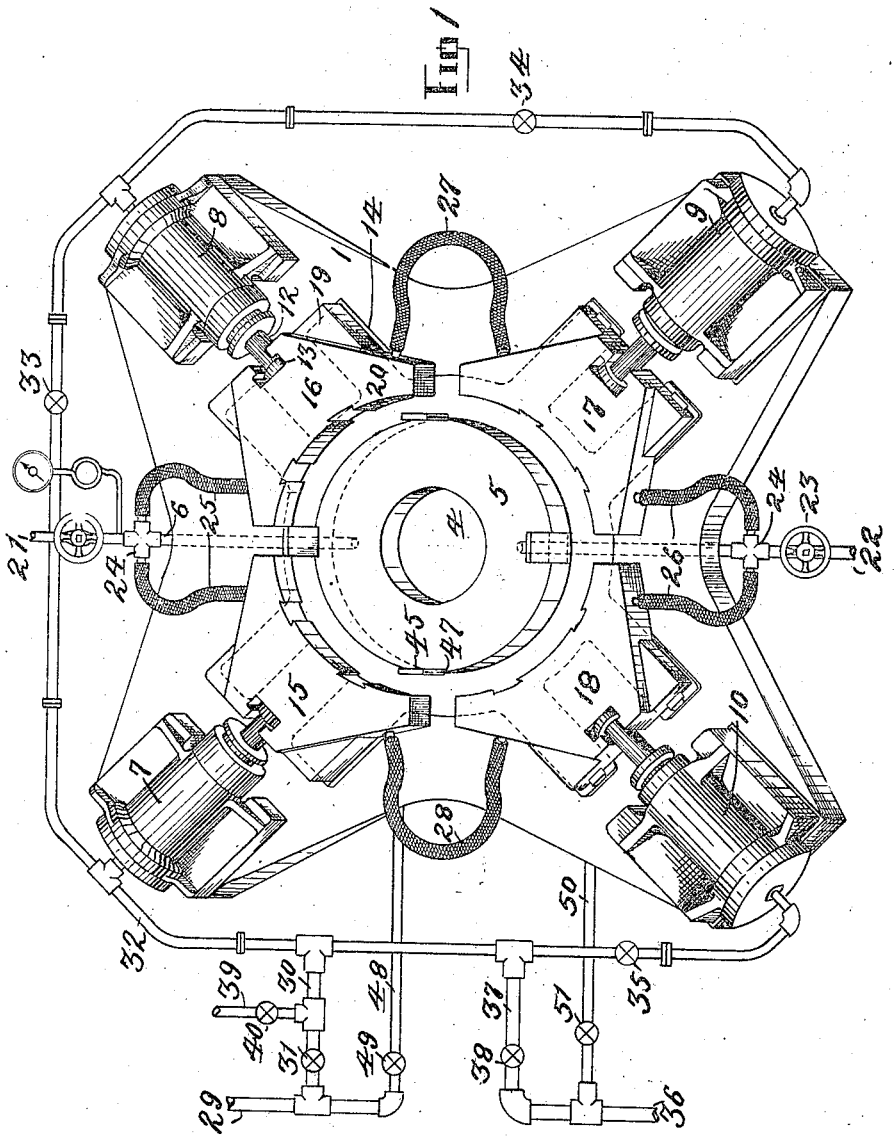

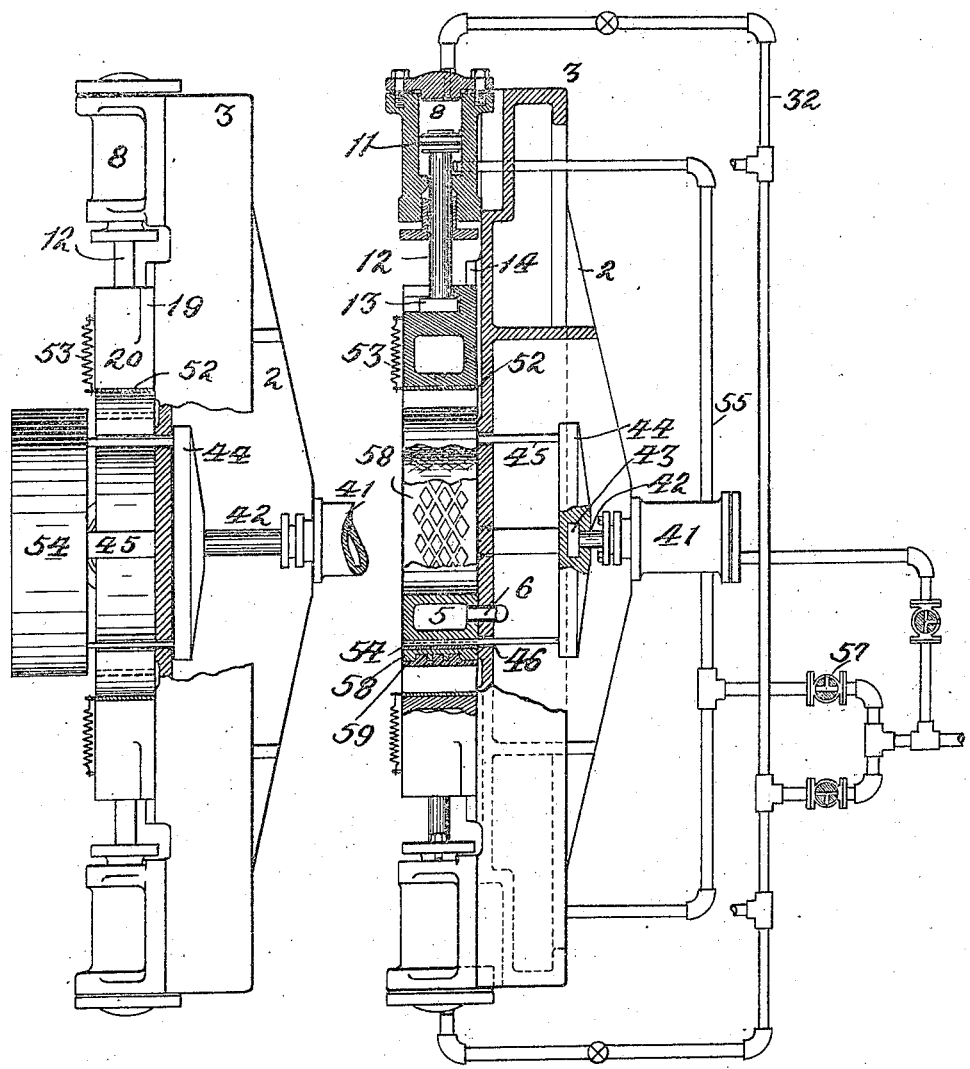

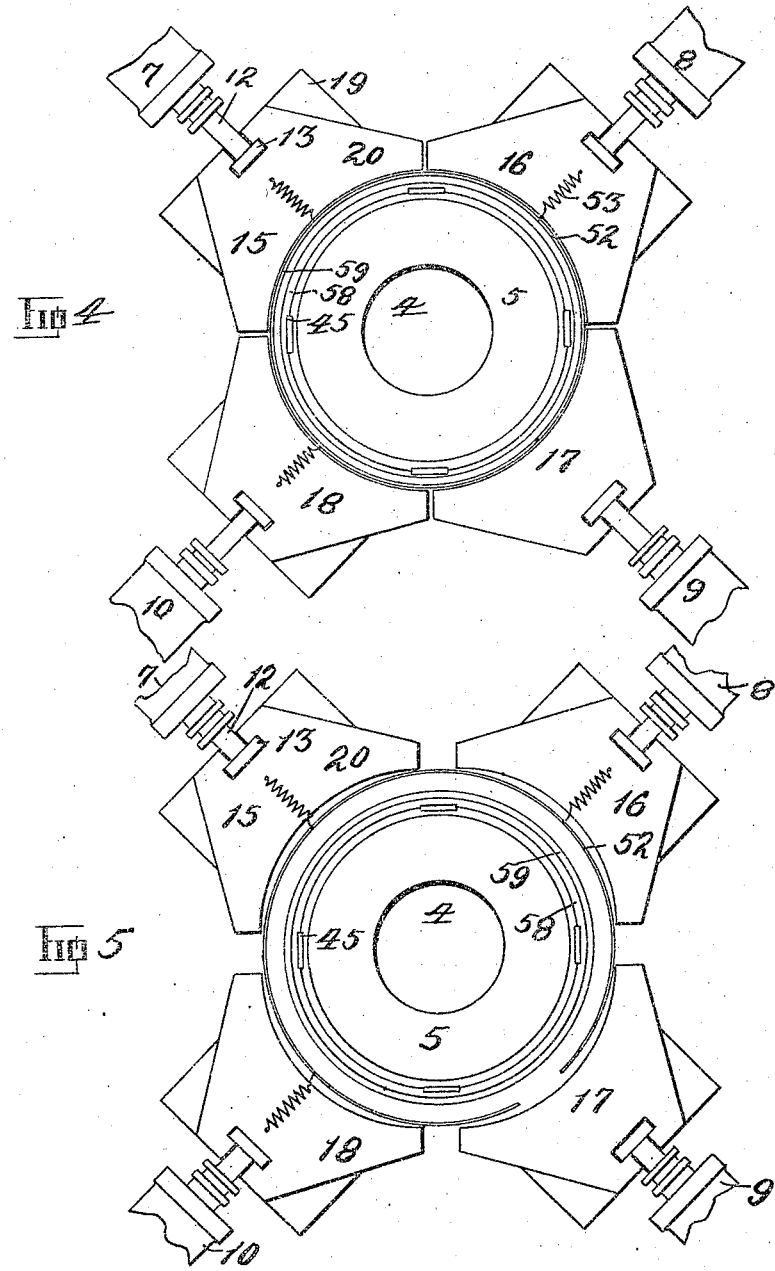

EDWARD NALL, OF AKRON, OHIO, ASSIGNOR TO THE GOODYEAR TIRE & RUBBER COMPANY, OF AKRON, OHIO, A CORPORATION OF OHIO.

VULCANIZER.

1,167,009.      Specification of Letters Patent.      Patented Jan. 4, 1916.

Application filed December 10, 1914. Serial No. 876,602.

*To all whom it may concern:*

Be it known that I, EDWARD NALL, a citizen of the United States, residing at Akron, in the county of Summit and State of Ohio, have invented new and useful Improvements in Vulcanizers, of which the following is a specification.

This invention relates to improvements in vulcanizers, more especially vulcanizers used for imparting what is known as a semi or partial cure to the tread-forming strips of pneumatic tires, wherein the outer face of the strips are provided with projections or depressions to give an uneven contour or configuration to the tread of the tire to increase its tractive properties and prevent skidding. Briefly, these tread strips of pneumatic tires have heretofore been made on the outside of an annular band, commonly called a drum, on the outer surfaces of which are intaglio impressions which produce counterpart projections on the tread strip for the purposes enumerated. In manufacturing them, a strip of unvulcanized rubber is placed about the drum and a number of windings of wet fabric under severe tension are wrapped about the strip and the drum placed on a car which is run into an open heat vulcanizer, (so called), the vulcanizer sealed, steam admitted, and after a partial cure is effected, the car is removed from the vulcanizer and the fabric strip is unwound from the partially cured rubber strip, which is then removed from the drum, and the process repeated. This takes a considerable amount of time as it must be done largely by hand and the cost thereof is high.

The object of this invention is to provide a vulcanizer by which a partial cure of a tread strip can be accomplished without the use of fabric, in a remarkably short time and with little or no hand labor, thereby reducing time and expense of the operation.

With the foregoing, and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in front elevation of a vulcanizer embodying this invention; Fig. 2, is a view in side elevation with portions thereof broken away to better illustrate the construction of the device. Fig. 3, is a view similar to Fig. 2 with portions of the device in section; Fig. 4, is a fragmentary view of a portion of the device showing the vulcanizer in its closed position; and, Fig. 5, is a view similar to Fig. 4 with the vulcanizer in its open position.

The entire mechanism is supported upon a cruciform-shaped frame 1 which is preferably inclined rearwardly at a slight angle, say, for instance, 15° to 20° from the perpendicular, and this frame or plate 1 is provided with reinforcing rearwardly-extending ribs 2 and a marginal strengthening flange 3. The frame 1 is further provided with a central aperture 4 around which is an annular drum-like hollow chamber 5 to which steam is admitted through the medium of inlet pipes 6. The drum 5 which forms one of the members of the vulcanizer is secured by any suitable means, such for instance, as cap screws, not shown, to the front face of the member 1. Secured to the four arms of the frame 1 and to the front face thereof are cylinders 7, 8, 9 and 10, in each of which is an ordinary piston 11 which bears a piston rod 12 the inwardly-projecting end of which is provided with a head 13. These cylinders are arranged with their axes radial to the center of the opening 4 and with the enlarged heads 13 pointed inwardly and toward each other. On the front face of the plate 1 and positioned between the drum 5 and each of the cylinders 7—10 inclusive, are guides or ways 14 arranged in pairs and parallel with the axes of the cylinders so that there is provided in front of each cylinder a pair of ways arranged with the working edges thereof parallel with a radius of the drum 5.

Shiftably mounted in each pair of ways 14 is a shiftable vulcanizer member and as they are all similar, a description of one is deemed sufficient. The various members, however, for accuracy, are respectively designated 15, 16, 17 and 18. Each of the members comprises a base 19 fashioned to fit and slide in a pair of ways 14 and a head or outer portion 20. The inner opposing faces of these members 20 are formed in the arcs of circles of which the axis of the opening 4 is the center. The members 20 are hollow to provide steam chambers to which steam is admitted through two inlet pipes 21 and 22, both provided with ordinary check-valves 23, and also provided with cross couplings 24. From the coupling 24 in the pipe 21 extends a steam hose 25 to the vulcanizer members 15 and 16, and from the cross coupling 24 in the pipe 22 extends a hose 26 to the steam chambers in the members 17 and 18. To further increase the circulation of steam through these steam chambers the members 16 and 17 are connected by a hose 27 and the members 15 and 18 by a similar connection 28.

The pistons in the cylinders are adapted to be initially operated by a fluid under low pressure, which is supplied through the medium of an inlet pipe 29 to which is connected a pipe 30 provided with a check-valve 31. The cylinders are further connected with the pipe 30 by means of a single pipe 32 provided with check valves 33, 34, and 35. When it is desired to operate the pistons in the cylinders by means of fluid under higher pressure, the pistons are connected with a supply pipe 36, which is connected with the pipe 32 by a pipe 37 in which is a valve 38. The pipe 30 is provided with a branch 39 in which is a valve 40.

Secured to the rear face of the plate 1 and preferably to the ribs 2 is a cylinder 41 provided with an ordinary piston carrying a piston-rod 42 which bears an enlargement 43 which serves to couple it to a disk-shaped head 44 from which project four arms 45 arranged parallel with the axis of the opening 4 and which are adapted to pass through suitable openings 46 in the wall of the member 1. The outer face of the drum 5 is provided with grooves 47 arranged in alinement with the openings 46 so that when the arms 45 pass through the openings 46 they are received in the grooves 47 which constitute guides therefor. The arms 45 are thicker than the depth of the grooves 47 so that the arms project outwardly beyond the normal peripheral face of the drum 5.

The piston in the cylinder 41 is operated from the low pressure main and is connected therewith by a pipe 48 and this cylinder is also connected with a high-pressure main by means of a pipe 50 and equipped with a valve 51.

Positioned in the space between the inner curved faces of the shiftable vulcanizer members 20 and the outer face of the drum or fixed vulcanizer member 5, is a broken ring 52 preferably of relatively thin flexible sheet metal and approximately equal in width to the transverse thickness of the drum 5 and members 20. This broken ring 52 is loosely connected with the members 15, 16 and 18 by means of coiled springs 53 so that as the mold members are moved to their outer or inoperative position the ring is opened and drawn away from the drum 5 as clearly shown in Fig. 5. In cases where the annular drum on which the tread strip is to be vulcanized is larger than will nicely and frictionally engage the outer faces of the arms and be sustained thereon, recourse is had to a supplemental filler-ring 54, as shown in Fig. 3.

The pistons in the cylinders 7—10 inclusive are forced outwardly by means of a fluid admitted thereto by means of a pipe 55 equipped with proper branches and equipped with a valve 57.

The operation of the device is as follows: The device is prepared for use by admitting suitable fluid under pressure through the pipe 55 which forces the pistons outwardly, and shifts the movable mold members 15—18 inclusive outwardly into the positions shown in Figs. 1, 2, 3 and 5. The piston in the cylinder 41 is operated to force the head 44 and arms 45 forwardly, as shown in Fig. 2. An ordinary tread-forming drum 58 equipped with a strip of unvulcanized rubber 59 is slipped over the arms 45 and held there by frictional engagement. Of course, if the drum is too large the filler-ring 54 is employed. The piston is then shifted rearwardly drawing the drum with its covering of rubber into the space between the fixed member 5 and the shiftable members 7—10 inclusive, of the vulcanizer and within the confines of the broken ring 52. Fluid under low pressure is admitted to the cylinder 7 which forces the movable vulcanizer member inwardly and as this member is placed on the side opposite to the broken portion of the ring 52 it serves to clamp the ring in place with the surplus slack or looseness of this ring disposed toward the broken portion thereof. The valves 33 and 35 are then opened, allowing the pistons in the cylinder 8 and 10 to operate and as these are placed opposite to each other and adjacent to the member 15 they carry any looseness or slackness of the ring forward toward the broken portion thereof. Lastly, the valve 34 is opened, and the piston in the cylinder draws the ends of the ring tightly together until they nicely abut and the entire ring is clamped about the rubber 59 on the drum 58. After this, and if desired, a fluid under higher pressure is admitted through the pipe 36. During this time, of course, live steam is admitted to the drum 5 by the pipes 6 and to the various members 15—18 inclusive, by means of the pipes 21 and 22.

After the proper time has elapsed for the partial curing of the rubber on the drum 58 the operation is reversed and the drum 58 removed and the partially cured strip is stripped from the drum and reversed in position and is ready to be applied to the carcass of a pneumatic tire and of course, the drum is ready for re-use.

It will be obvious of course, that if found desirable all of the members 15—18 may be operated simultaneously to reduce the time of the operation.

I claim:—

1. A vulcanizer comprising a supporting frame, a fixed member of cylindrical contour secured to said frame the outer face of said member being adapted to receive and support an annular drum having a layer of unvulcanized rubber thereon, a plurality of power-actuated radially-movable members having concave inner faces the curvature of which approximates that of the cylindrical member, and a broken ring interposed between said fixed and said movable members and adapted to tightly clamp the layer of rubber on the drum when the movable members are moved to their inner or operative positions.

2. A vulcanizer comprising a supporting frame, a fixed member of cylindrical contour secured to said frame the outer face of said member being adapted to receive and support an annular drum having a layer of unvulcanized rubber thereon, a plurality of power-actuated radially-movable members having concave inner faces, the curvature of which approximates that of the cylindrical member, a broken ring interposed between said fixed member and said movable members and adapted to be clamped tightly about the layer of rubber when the movable members are moved to their inner or operative positions, and an ejector adapted to shift said drum from said cylindrical member.

3. A vulcanizer comprising a supporting frame, a fixed member of cylindrical contour secured to said frame the outer face of said member being adapted to receive and support an annular drum having a layer of unvulcanized rubber thereon, a plurality of power-actuated movable members adapted to move radially toward and away from said fixed member the inner faces of which are fashioned to correspond in curvature to the peripheral face of said fixed member, a broken ring interposed between said fixed and said movable members and adapted to be clamped tightly about the layer of rubber when the movable members are moved to their inner or operative positions, and means for independently heating both said fixed and each of said movable members.

4. A vulcanizer comprising a supporting frame, a fixed member of cylindrical contour secured to said frame the outer face of said member being adapted to receive and support an annular drum having a layer of unvulcanized rubber thereon, a plurality of power-actuated movable members adapted to move radially toward and away from said fixed member the inner faces of which are fashioned to correspond in curvature to the peripheral face of said fixed member, a broken ring interposed between said fixed and said movable members and adapted to be clamped tightly about the layer of rubber when the movable members are moved to their inner or operative positions, means for independently heating both said fixed and each of said movable members, and means for loosely connecting said ring and movable members whereby when the latter are moved to their outer or inoperative position said ring is withdrawn from engagement with said rubber layer.

5. A vulcanizer comprising a supporting frame, a fixed member of cylindrical contour secured to said frame the outer face of said member being adapted to receive and support an annular drum having a layer of unvulcanized rubber thereon, a plurality of power-actuated movable members adapted to move radially toward and away from the fixed member, the faces of said members which oppose the fixed member corresponding in curvature therewith, a broken ring interposed between said fixed and said movable members and adapted to be clamped tightly about the layer of rubber when the movable members are moved to their inner or operative positions, and means capable of operating said movable members either simultaneously or successively.

6. A vulcanizer comprising a supporting frame, a fixed member of cylindrical contour secured to said frame, the outer face of said member being adapted to receive and support an annular drum having a layer of unvulcanized rubber on the peripheral surface thereof, an ejector comprising a plurality of arms moving parallel with the axis of said fixed member and arranged at the peripheral face thereof, a plurality of power-actuated movable members to move radially toward and away from said fixed member, the inner faces of which are curved to correspond with the peripheral face of said fixed member, and a broken ring interposed between said fixed and said movable members and adapted to be clamped tightly about the layer of rubber on the drum when the movable members are moved to their inner or operative positions.

7. A vulcanizer comprising a supporting frame, a fixed member of cylindrical contour secured to said frame, the outer face of said member adapted to receive and support an annular drum having a layer of unvulcanized rubber on the peripheral face thereof, an ejector comprising a plurality of arms moving parallel with the axis of said fixed member and arranged at the peripheral surface thereof, a plurality of power-actuated movable members adapted to move radially toward and away from said fixed member, the inner faces of which are curved to correspond with the peripheral face of said fixed member, means to shift said movable members either simultaneously or successively, and a broken ring interposed between said fixed and said movable members and adapted to be clamped tightly about the layer of rubber on the drum when the movable members are moved to their inner or operative positions.

8. A vulcanizer comprising a supporting frame, a fixed member of cylindrical contour secured to said frame and provided on the peripheral face thereof with a plurality of longitudinally extending grooves, the supporting frame being provided with apertures in alinement with said grooves, the outer face of said fixed member constituting means to receive and support an annular drum equipped with a layer of unvulcanized rubber on the peripheral face thereof, a power-actuated head positioned rearwardly of said frame, a plurality of arms adapted to move shuttle-fashion through the apertures in said frame and in the grooves in the peripheral faces of said fixed member and arranged to constitute an ejector for shifting said drum away from said fixed member, a plurality of power-actuated movable members adapted to move radially with respect to said fixed member the faces thereof which oppose the fixed member curved to correspond with the peripheral face thereof, and a broken ring interposed between said fixed and said movable members and adapted to be clamped tightly about the layer of rubber on said drum by said movable members when they are moved to their inner or operative positions.

9. A vulcanizer comprising a supporting frame, a cylindrical abutment thereon, a forming-drum bearing on its outer peripheral surface a layer of unvulcanized rubber fitting over said abutment and supported against inward movement thereby, and a plurality of power-actuated plungers adapted to move radially toward and away from said drum, the inner faces of said plungers curved in definite fractional arcs of a circle, the center of which is coincident with the axis of said abutment, said plungers arranged when moved inwardly to their operative position to tightly clamp the layer of rubber on said drum during the vulcanizing operation.

10. A vulcanizer comprising a supporting frame, a fixed member of cylindrical peripheral contour mounted on said frame, a plurality of power-actuated members adapted to move radially toward and away from said fixed member, the inner faces of said member curved to constitute definite fractional arcs of a circle the center of which is coincident with the axis of said fixed member, said members adapted when moved to their inner or operative position to coöperate with said fixed member for tightly clamping a drum equipped with a peripheral layer of unvulcanized rubber during the vulcanizing operation, and an ejector for displacing said drum after said operation.

11. A vulcanizer comprising a supporting frame, a fixed member of cylindrical peripheral contour mounted on said frame, a plurality of power-actuated members adapted to be moved radially toward and away from said fixed member, the inner faces of said members curved to constitute definite fractional arcs of a circle the center of which is coincident with the axis of said fixed member, said members adapted when moved to their inner or operative positions to coöperate with said fixed member for tightly clamping a drum equipped with a peripheral layer of unvulcanized rubber during the vulcanizing operation, and a broken ring interposed between said movable members and said rubber layer.

12. A vulcanizer comprising a supporting frame, a fixed member of cylindrical peripheral contour mounted on said frame, a plurality of power-actuated members adapted to be moved radially toward and away from said fixed member, the inner faces of said members curved to constitute definite fractional arcs of a circle the center of which is coincident with the axis of said fixed member, said members adapted when moved to their inner or operative positions to coöperate with said fixed member for tightly clamping a drum equipped with a peripheral layer of unvulcanized rubber during the vulcanizing operation, a broken ring interposed between said movable members and said rubber layer, and an ejector for displacing said drum.

In testimony whereof I have hereunto set my hand in presence of two subscribing witnesses.

EDWARD NALL.

Witnesses:
C. E. HUMPHREY,
H. B. HAMLEN.